United States Patent
Brombach et al.

(10) Patent No.: US 12,140,119 B2
(45) Date of Patent: Nov. 12, 2024

(54) METHOD AND WIND PARK FOR FEEDING ELECTRIC POWER INTO AN ELECTRIC SUPPLY NETWORK

(71) Applicant: Wobben Properties GmbH, Aurich (DE)

(72) Inventors: Johannes Brombach, Berlin (DE); Marcus Letzel, Achim (DE); Swantje Amelsberg, Berne (DE)

(73) Assignee: WOBBEN PROPERTIES GMBH, Aurich (DE)

( * ) Notice: Subject to any disclaimer, the term of this patent is extended or adjusted under 35 U.S.C. 154(b) by 0 days.

(21) Appl. No.: 17/285,059

(22) PCT Filed: Oct. 15, 2019

(86) PCT No.: PCT/EP2019/077974
§ 371 (c)(1),
(2) Date: Apr. 13, 2021

(87) PCT Pub. No.: WO2020/079000
PCT Pub. Date: Apr. 23, 2020

(65) Prior Publication Data
US 2021/0388814 A1 Dec. 16, 2021

(30) Foreign Application Priority Data
Oct. 15, 2018 (DE) ............... 10 2018 125 465.2

(51) Int. Cl.
*F03D 7/00* (2006.01)
*F03D 7/02* (2006.01)
(Continued)

(52) U.S. Cl.
CPC ........... *F03D 7/0284* (2013.01); *F03D 7/048* (2013.01); *F05B 2260/8211* (2013.01); *H02J 3/381* (2013.01); *H02J 2300/28* (2020.01)

(58) Field of Classification Search
CPC .............. F03D 7/0284; F03D 7/048; F05B 2260/8211; F05B 2270/1033;
(Continued)

(56) References Cited

U.S. PATENT DOCUMENTS 8,295,989 B2 * 10/2012 Rettger ............... H02J 3/46
706/46
9,690,884 B2    6/2017 Guzman et al.
(Continued)

FOREIGN PATENT DOCUMENTS

CA    2770637 A1    9/2012
CN    101706335 A   5/2010
(Continued)

OTHER PUBLICATIONS

Giebel et al., "The State of the Art in Short-Term Prediction of Wind Power | A Literature Overview, 2nd Edition", Jan. 30, 2011, retrieved from: http://www.windpowerpredictions.com/images/downloads/the_state_of_the_art_in_short-term_prediction_of_wind_power.pdf, 110 pages.

*Primary Examiner* — Julio C. Gonzalez
(74) *Attorney, Agent, or Firm* — Seed IP Law Group LLP

(57) ABSTRACT

A method for feeding electric power into an electric supply network using a wind park having wind power installations is provided. An expected power is determined for a predetermined feed-in period, where the expected power indicates a power value or temporal profile of power expected to be available to the park as power from wind in the predetermined feed-in period. An expected accuracy is determined and is a measure of how accurately the power reaches the expected power in the feed-in period. To determine the expected power, at least one expected wind variable representative of the expected wind speed is determined using a weather forecast, and the expected wind variable is additionally determined or verified, proceeding from the weather (Continued)

forecast, using a correction rule based on local weather data and/or operating data of the park. The expected power is determined on the basis of the expected wind variable.

19 Claims, 6 Drawing Sheets

(51) Int. Cl.
*F03D 7/04* (2006.01)
*H02J 3/38* (2006.01)

(58) Field of Classification Search
CPC .......... F05B 2270/335; F05B 2260/821; H02J 3/004; H02J 3/381; H02J 2300/28; H02J 3/38; Y02A 30/00; Y02E 10/72; Y02E 10/76; Y04S 10/50
See application file for complete search history.

(56) References Cited

U.S. PATENT DOCUMENTS

| 10,975,846 | B2 * | 4/2021 | Srivastava ................ H02J 3/38 |
| 2013/0046492 | A1 | 2/2013 | Westergaard |
| 2014/0195159 | A1 | 7/2014 | Mewes et al. |
| 2014/0244188 | A1 * | 8/2014 | Bai ......................... F03D 17/00 |
| | | | 702/60 |

FOREIGN PATENT DOCUMENTS

| CN | 103023065 A | | 4/2013 | |
| CN | 106972533 A | * | 7/2017 | |
| CN | 107732962 A | | 2/2018 | |
| DE | 102017129299 A1 | | 6/2019 | |
| EP | 3051124 B1 | * | 6/2018 | ............ F03D 13/30 |
| EP | 3432091 A1 | | 1/2019 | |
| WO | 2018114324 A1 | | 6/2018 | |
| WO | WO-2019238185 A1 | * | 12/2019 | ............ F03D 7/028 |

* cited by examiner

# METHOD AND WIND PARK FOR FEEDING ELECTRIC POWER INTO AN ELECTRIC SUPPLY NETWORK

BACKGROUND

Technical Field

The present invention relates to a method for feeding electric power into an electric supply network by means of at least one wind park having a plurality of wind power installations. The invention also relates to a corresponding wind park.

Description of the Related Art

A method for feeding electric power into an electric supply network by means of a wind park that combines a plurality of wind power installations is generally known. In addition to purely feeding in power for the purpose of supplying consumers, such wind parks are also increasingly being assigned tasks in the field of network system services as well as and including support tasks through to tasks of network restoration or even preparing for or carrying out a so-called black start. Such tasks are sometimes difficult for a wind park to perform, particularly because its primary energy, specifically wind, cannot only fluctuate greatly, but is also difficult to forecast.

In this case, it is particularly problematic that, although general weather forecasts are comparatively accurate and are readily available, they are usually available for larger geographical areas than the comparatively small geographical area of a wind park. In the case of large wind parks, the problem of the wind strength of the wind park, in particular, not being homogeneous over the geographical region of the wind park may be present in addition or instead. Therefore, a different wind speed may prevail at one location of the wind park than at another location of the wind park and this situation may change constantly.

On the other hand, it would be possible to produce local weather forecasts for a wind park or even for certain regions of the wind park in a locally resolved manner but they have rather a low degree of accuracy.

Therefore, the basic problem of a forecastability of wind speeds and therefore powers for wind parks being rather inaccurate remains. This makes it difficult to be able to plan for any processes of feeding in power. This may be problematic, in particular, for network restoration or even a black start if it requires a power profile which is to be fed in, but then cannot be achieved or can be only inadequately achieved possibly on account of a drop in the wind.

The German Patent and Trademark Office searched the following prior art in the priority application relating to the present application: DE 10 2017 129 299 A1, U.S. Pat. No. 9,690,884 B2, US 2014/0 195 159 A1, EP 3 432 091 A1 and CA 2 770 637 A1.

BRIEF SUMMARY

Improving an ability to plan available power for a wind park is provided here.

A method is provided. The starting point is therefore a method for feeding electric power into an electric supply network by means of at least one wind park. Such a wind park has a plurality of wind power installations, at least one wind power installation which feeds power into the electric supply network via a common network connection point. The wind park therefore feeds electric power into the electric supply network at the network connection point.

It is also proposed that an expected power is determined for a predetermined feed-in period. The expected power indicates a value of a power or a temporal profile of a power which can be expected to be available to the at least one wind park as power from wind in the predetermined feed-in period. This should initially be generally understood as meaning that this wind power is available and can also be at least theoretically received and converted by the wind park. This may initially disregard any technical limits.

In particular, the expected power may be understood as meaning the sum of all rotor powers of all wind power installations in the wind park. Wind which acts on the rotor of the wind power installation and, in this respect, is available as power for the rotor, which is referred to as rotor power, prevails at each wind power installation. The expected power of the wind park is then the sum of all of these rotor powers of all wind power installations in the wind park or of all considered wind power installations in the wind park.

However, the expected power may also be understood as meaning the power of the wind park which can be fed in. Such a power of the wind park which can be fed in may differ from the sum of all rotor powers in that the power which can be fed in, which can also be referred to as the feed-in power, can concomitantly take into account power losses and power limits and is therefore usually lower than the sum of all rotor powers.

It is now additionally proposed that an expected accuracy is determined for the expected power and is a measure of how accurately the power reaches the expected power in the feed-in period. In this respect, the expected accuracy is therefore a measure of the quality of the power prediction. It has been recognized here, in particular, that it is not only important to determine an expected power as accurately as possible but it is also important for a good planning capability to be able to estimate how greatly the power will then subsequently actually differ from the expected power when the predicted feed-in period is reached. In this respect, there are different proposals for indicating the expected accuracy, which is also specified below. One possible way of quantifying the expected accuracy is to specify a P90 value which describes the wind park power which at least occurs with a probability of 90%. With a probability of 90%, the power quantified thereby or a higher power therefore occurs. The P90 value can therefore form the expected accuracy according to one variant.

Additionally or alternatively, it is proposed that, in order to determine the expected power, at least one expected wind variable ($P_{MO}$) which is representative of the expected wind speed is predetermined with the aid of a weather forecast, and the expected wind variable is additionally determined or verified, proceeding from the weather forecast, by means of a correction rule on the basis of local weather data and/or operating data of the wind park, wherein the expected power ($P_F$) is determined on the basis of the expected wind variable ($P_{MO}$).

The weather forecast which is specifically created, in particular, for a larger geographical region than the area occupied by the wind park may have deviations or errors at the wind park. In this respect, it has been recognized that such deviations or errors may be at least reduced if local weather data and/or operating data of the wind park are used for improvement. The local weather data and operating data of the wind park may also be referred to as local wind park data. They may comprise weather data in the wind park or its environment, such as wind speeds, wind directions, temperature, precipitation and air pressure, but also specific operating data, such as generated or output power. The local weather data or some of the latter may also be captured in the wind park, for example the wind speed and wind direction. The wind direction may also be derived from azimuth positions of the wind power installation.

These local wind park data may then be used to correct the weather forecast in order to have a better basis for determining the expected wind variable. The expected wind variable is therefore determined as a prediction and may have a high degree of accuracy as a result of the correction rule.

The expected wind variable may itself be a wind speed or else a profile of a wind speed which specifically reflects the expected wind speed as far as possible. However, it may also be another representative variable, for example a normalized value which can be normalized to nominal wind speed, for example. However, the practice of already taking a power, for example a rotor power, which could be specifically generated at the expected wind speed, as a basis here also comes into consideration.

The fact that the expected wind variable is verified, in particular, on the basis of operating data of the wind park also comes into consideration. This is proposed, in particular, for the variant in which the expected wind variable itself is a power and is compared with the actual power. One possibility is for the expected wind variable to be a power profile which was created over a predetermined prediction period. The start of the prediction period can correspond to the current time and the remaining prediction period is therefore in the future. The expected wind variable, specifically its power value, at the start of the prediction period can then be compared with the current power value, the comparable power of the wind park. If these two power values differ, for example, by a deviation factor, for example the power value of the prediction is 20% below the current power value of the wind park, the prediction can be corrected by 20%, that is to say the deviation factor. This means that the expected wind variable for the entire prediction period is corrected by this deviation factor. This deviation factor would then be the correction rule.

The principle can also be analogously applied to the expected wind value if the latter is a predicted wind speed and is compared with a measured wind speed, to name a further example. This can also be applied to further cases, for example a wind direction, in which case a wind direction, in particular, can be considered as a boundary condition for the wind speed. However, the wind direction may be an important variable, in particular, for taking park effects into account. In this respect, the expected wind variable may comprise a plurality of variables, specifically the wind speed and the wind direction according to one embodiment.

Finally, the expected power is determined on the basis of the expected wind variable. In this respect, the expected wind variable is still substantially independent of specific data relating to the wind park, such as technical availability or shadowing effects in the park, and is substantially a prediction for the wind, whereas the expected power specifically relates to the power which is then fed in or can be generated by the park. In one embodiment, the expected power can correspond to the expected wind variable.

According to one embodiment, it is proposed that the weather forecast is created over a forecast period, and the expected wind variable and/or the expected power is/are created as a short-term prediction over a prediction period, wherein the forecast period is at least ten times, preferably at least fifty times, in particular at least one hundred times, as long as the prediction period. This means, in particular, that the weather forecast also extends further into the future than the short-term prediction. In this case, it was recognized, in particular, that a short prediction period is sufficient for network restoration or a black start, and a short accurate forecast is therefore better than a long inaccurate forecast.

This is because a technical problem, rather than an economic problem, is taken as a basis here, in particular. The determination of the expected wind variable, that is to say the short-term prediction in particular, is not used to calculate power renumeration or to control the operation of the wind park according to the power renumeration, but rather the short-term prediction thereby makes it possible for the wind park to also undertake a plannable supporting task for the electric supply network. A prediction period of a short-term prediction is, in particular, in the range of up to one hour, in particular in the range of up to half an hour, whereas a forecast period of a weather forecast is in the range of more than several hours, in particular more than half a day or even more than several days.

A short-term prediction in the range of 10 minutes to 30 minutes, in particular approximately 15 minutes, is preferably proposed. A forecast period may comprise, in particular, 3 calendar days, that is to say the current day, the next day and the day after next, and is therefore not in the sense of 72 hours according to one example. In addition, an update is preferably carried out every 6 hours, for example by the weather service which provides the weather forecast. Depending on how old the update is, the weather forecast, which may also be available as a prediction stored in a storage device, can therefore be used to predict 48 to 72 hours in the future depending on the time of day. This forms the basis for the improved short-term prediction. However, the practice of considering full days instead of calendar days also comes into consideration, in principle, with the result that a weather forecast is then available for 72 hours. However, other forecast periods which are usually at least one complete day for a weather forecast, however, also come into consideration, in principle.

The prediction period is therefore significantly shorter than the forecast period. The expected wind variable and the expected power usually have the same time horizon and therefore the same prediction period, with the result that both are then preferably provided as short-term predictions.

Additionally or alternatively, it is proposed to predetermine the expected wind variable recurrently or continuously in each case for a comparison period. This comparison period can correspond, in principle, to the feed-in period, but is preferably a separate shorter period which is also accordingly redefined recurrently and may also be a sliding comparison period in the case of continuous predetermination.

In this respect, it is proposed that a forecast comparison is carried out for each comparison period for which the expected wind variable was predetermined. In this forecast comparison, a forecast variable is compared with a current wind variable which is representative of the current wind speed in the respective comparison period. The forecast variable may be, for example, the expected wind variable but may also be, for example, the expected power. The fact that this is a wind speed or a profile of the wind speed, in particular in the case of the expected wind variable, also comes into consideration. This is then compared with a current wind variable which is representative of the current wind speed in the respective comparison period.

In particular, either variables of the same unit, that is to say two powers or two wind speeds for example, or two normalized variables are naturally compared here. Accordingly, the current wind variable may also be a wind speed or, for example, a power which is representative of the current wind speed specifically at that moment. The practice of using the park power which is then actually generated comes into consideration in this respect, for example. If appropriate, this could also be changed computationally if, for example, a wind power installation in the park fails, which may be known to a central control unit.

If the wind park reaches its nominal power in this case and is then limited thereby, a greater available power can possibly be calculated, for example, from further key data such as rotor blade positions.

In this respect, a comparison is therefore carried out between the predicted value and the actual value, which can be referred to as a forecast comparison. At least one adjustment rule is determined from this forecast comparison in order to improve the expected power by means of the at least one adjustment rule. The practice of improving a calculation rule for calculating the expected power from the expected wind variable comes into consideration, in particular, as an improvement. Additionally or alternatively, the correction rule may be improved by means of the adjustment rule.

In the simplest case, for illustration, the adjustment rule could be a factor, for example 1.2 or 0.8, by which the calculation rule, the correction rule and/or another rule is/are multiplied because it was specifically discovered in the forecast comparison that the expected power was 20% below or 20% above the actual power. This adjustment rule may also be valid over the comparison period, in particular, and can be ideally used for each feed-in period.

However, the practice of applying the adjustment rule directly to the expected wind variable or the expected power also comes into consideration. However, an adjustment other than only a factorial adjustment also comes into consideration, which is also explained below. The practice of correcting a temporal shift using the adjustment rule also comes into consideration, in particular. This can also be carried out directly or using the calculation rule, the correction rule and/or another rule.

This is based, in particular, on the concept of a weather forecast being very precise but not being entirely precise with respect to the location information. However, wind speeds also move on in a similar manner to clouds and it has been recognized that a local inaccuracy may usually be a temporal inaccuracy, that is to say a predicted wind speed or a predicted wind direction arrives at the wind park only somewhat later than forecast or somewhat earlier. It is therefore possible for a wind prediction, for example, to forecast a particular wind profile for a particular period and for this wind profile to also actually impinge on the wind park in a similar manner, but somewhat later or somewhat earlier. This can also be identified in the forecast comparison and the adjustment rule can be accordingly determined.

In any case, the expected power is finally determined on the basis of the expected wind variable and the adjustment rule, in which case the latter has a direct or indirect influence, as described above.

The expected power is preferably determined using a power estimator. In this case, it is proposed, in particular, that the expected power is determined from an estimated wind speed or an estimated wind speed profile using a power estimator. Such a power estimator may be in the form of a state observer which simulates a wind power installation or a wind park and, like the latter, receives a wind speed, in addition to the wind direction, as an input variable and then behaves, as a model, like the wind power installation or the wind park and accordingly also outputs a power as a system variable.

Additionally or alternatively, the expected power can be additionally determined taking into account boundary conditions (e.g., boundary conditions 376). In this case, one or more of the boundary conditions explained below can be taken into account. In particular, technical availability of the wind power installations in the wind park can be taken into account. In the simplest case, this means that it is taken into account which of the wind power installations in the wind park are operating and whether one or more wind power installations have failed because they must be temporarily serviced, for example.

However, the fact that a wind power installation or a plurality of wind power installations in the park is/are operated in a reduced manner also comes into consideration. The consideration of when a power limit is reached also comes into consideration. Such a power limit may be a nominal power, but such a power limit may also be an artificially predefined limit, for example a limit which is predefined for reasons of noise protection, to name just one example. Such a limitation may then possibly affect only one wind power installation or individual wind power installations in the park. A further limit power may also be predefined by a network operator of an electric supply network, into which the wind park feeds power.

Information relating to available controllable loads may also be a boundary condition. In this case, the fact that such a load, for example a cold store operated by the wind park, can at least briefly stand back in terms of its power consumption, if appropriate in the event of a power bottleneck, comes into consideration, in particular. This makes it possible to virtually activate a power. This is important, in particular, when the undershooting of a minimum power is intended to be avoided.

The practice of taking into account information relating to storage devices which are available for feeding in electric power comes into consideration as a further boundary condition. Such available storage devices may provide power for a certain period and can thereby bridge an excessive drop in power. This is also particularly suitable for avoiding an excessive decrease in the power which is fed in.

In particular, the boundary conditions mentioned above can also be used to determine the expected accuracy. A low storage capacity or a low power consumption of a controllable consumer can sometimes already increase a guaranteed minimum power and therefore a corresponding forecast of a minimum power. This is because the problem of a minimum power being undershot often involves this happening only in the short term or possibly also only rarely on account of the rarely ideally constant wind. In order to then improve the overall power balance of the wind park in this case, that is to say to bridge a rare drop in particular, such a low power or, with respect to the storage device, low energy may sometimes suffice since such support can usually be dispensed with the rest of the time.

Information relating to follow-on effects in the wind park is a further boundary condition. In this case, it was recognized, in particular, that not just the power characteristic curve of an individual wind power installation, together with a wind forecast, allows a power prediction with a high degree of accuracy. Rather, it was recognized that the power of the wind power installations in a park group may be lower than if the wind power installation were to be operated as a stand-alone wind power installation. In this respect, it can generally be assumed, on the one hand, that the wind field is attenuated in comparison with an open area in the wind park.

However, it may also be taken into account that specific follow-on effects influence the power of individual wind power installations. If a wind power installation is downstream of another wind power installation, specifically with reference to the prevailing wind direction, this downstream wind power installation may receive significantly less wind and may therefore accordingly generate less power. However, this depends very greatly on the wind direction, and even a few degrees of change in the wind direction may result in this rear wind power installation which was previously downstream of the front wind power installation no longer being affected by this follow-on effect. This can be taken into account as a boundary condition.

Additionally or alternatively, it is proposed that the expected power is additionally determined by individually considering the wind power installation in the wind park. In this respect, it is proposed, in particular, that the technical performance of each wind power installation is stored in a table (e.g., table 374 in FIG. 3) for the wind park. It is additionally proposed that the table has respectively stored a forecast technical performance for each wind power installation on the basis of its azimuth orientation or on the basis of the wind direction and optionally on the basis of a time of day. Additionally or alternatively, the performance may be stored on the basis of the wind speed. A multidimensional table may be provided for this purpose. This can then be used, together with the forecast wind speed, to determine or improve the expected power. Different variants may preferably be provided for the expected accuracy, according to which the expected accuracy specifically contains or forms information explained below. In this case, the expected accuracy may also contain a plurality of or all of the items of information explained below.

In this case, one preferred variant is for the expected accuracy to indicate a first power limit which in turn indicates a power or a power profile which is not undershot within the predetermined feed-in period with a predetermined realization probability. It is therefore possible to indicate, for example, a constant power value or a wind profile over time, specifically over the feed-in period, which is not undershot within the predetermined feed-in period, that is to say is not undershot a single time, for example with a probability of 95%.

Very good planning can then be carried out with such an indication, particularly when this 95% probability, which is mentioned by way of example and which therefore here denotes the predetermined realization probability, can be accepted, that is to say when it can be accepted that the remaining 5% will possibly occur. In this case, it should also be taken into account that a plurality of wind parks can usually operate in this manner. Insofar as brief undershooting of the forecast expected power in a wind park can be expected only with a probability of 5%, it is unlikely that the remaining wind parks which operate in a similar manner have, at the exact same moment, this drop in power which was expected only with the probability of 5% mentioned by way of example. In other words, the predetermined realization probability need not necessarily be 1, that is to say 100/a.

According to one embodiment, the expected accuracy may additionally or alternatively indicate a second power limit which in turn indicates a power or a power profile which must not be undershot on a medium-term average. The power profile can therefore be undershot very briefly, but not in the long term. Such a medium-term average is, in particular, one which is determined over a period of 10-60 seconds. If the power therefore falls below the second power limit for 5 seconds, but is considerably above said power limit before and afterward, the medium-term average is then not below the second power limit overall. In this case too, it is again important that the individual power of a wind park is less important, in particular for a network operator, than the total power of a plurality of wind parks feeding power into his network. As long as the second power limit is therefore not undershot on a medium-term average, it can be assumed that brief undershooting is scarcely noticed by the electric supply network because various other wind parks which are feeding in power will not have their power drop at the same moment, if at all.

According to a further embodiment, it is likewise additionally or alternatively proposed that the expected accuracy indicates a third power limit which in turn indicates a power or a power profile which must not be undershot on a short-term average. Such a third power limit is usually lower in this case than the second power limit because a short-term average fluctuates more greatly than a medium-term average and can therefore also assume lower values. An average over a period of 5-10 seconds, in particular, is considered here as a short-term average. The total power which, with the same mode of action and the same determination of an expected accuracy of a plurality of wind parks, is fed in by this plurality of wind parks is also particularly important to a network operator here.

According to a further embodiment, it is proposed that the weather forecast or weather data for creating a weather forecast is/are regularly transmitted to the at least one wind park by an external weather service. In this respect, the wind park therefore does not carry out any of its own measurements for the weather forecast, but rather also uses, in particular, generally available weather forecasts. Such weather forecasts can also be regularly prepared in such a manner that a process computer in a wind park can process them.

For this purpose, it is also proposed that the wind park at least temporarily stores the respectively transmitted weather forecast. This is intended as a wise precaution for any interruption to the external weather service. This is because, in the event of an interruption to the external weather service, the expected power is then estimated on the basis of at least one stored weather forecast. Clearly speaking, an older weather forecast than would be available at that moment if there were no interruption to the external weather service is then available.

For this case, it is then proposed, in particular, that the stored weather forecast is adjusted taking into account local current meteorological measured values, in particular is improved by means of the correction rule on the basis of the local wind park data. This is based, in particular, on the concept of a weather forecast having forecast an increasing wind speed from 4 m/sec around 16:00 to 8 m/sec around 17:00, for example. However, the local current meteorological measured values then detect, for example only around 16:20, that the wind speed begins to increase from 4 m/sec. It can then be assumed, together with the stored weather forecast, that the wind speed will increase to 8 m/sec by 17:20.

In this simplified example, the even older weather forecast was therefore able to forecast the increase in the wind speed and the local measurement was able to help to make this forecast more precise, specifically, in the simplified example, only with respect to the starting point at which the wind speed increased. In this respect, a solution for adjusting the forecast very precisely to the wind park was found. Moreover, the described principle could also be used for the case in which the weather forecast did not have to be stored. However, for the case in which it had to be stored, a very good forecast quality can still be achieved thereby for the specific wind park.

In this case, it was also recognized that a short-term prediction of the expected wind value, in particular, can be created with good accuracy on the basis of a longer-term weather forecast. The longer-term weather forecast can also be obtained from a weather service a relatively long time in advance. The short-term prediction is provided, in particular, for a black start or network restoration. If such a case occurs, the data connection to the weather service may be interrupted. However, older weather forecasts which have already been stored at an earlier time by the wind park are then still available. These older weather forecasts can then be improved on the basis of the local wind park data. The data connection to the weather service, which may be specifically interrupted, is not needed for the local wind park data or at least some of the latter. However, using the previously stored weather forecasts means that at least the short-term prediction can at least still resort to older weather forecasts and can improve the forecast quality by means of the local wind park data.

According to a further embodiment, it is proposed that a black start and/or network restoration is/are planned on the basis of the expected power. A black start is a situation in which the feeder, that is to say the wind park here, starts an electric supply network or a network section of the latter without any help from the outside. This network section is therefore deenergized and the wind park must build up the appropriate voltage at an appropriate frequency and provide power to the first consumers connected to the network section.

This may be followed by network restoration in which further network sections which were deenergized or were at least disconnected from one another are connected again and then have a network voltage at a common network frequency and can transmit power. However, network restoration without a previous black start or at least without a black start by the wind park can also be planned.

Knowledge of the available power is very important for such planning. This knowledge is required at least for the period in which the network operator can still react during a black start and/or network restoration or automatic network controllers can react. The reason is that it can be definitely accepted that a wind park reduces the feed-in power in a period of 15 minutes on account of a lack of wind as long as the network operator knows and can accordingly start up other wind parks or power plants. However, a period after the black start or network restoration should also be concomitantly taken into account and planned in this case by virtue of the network which has been started or restored also having to be established at a stable operating point. In this respect, this period for which the available power must be known may be comparatively long, for example a quarter of an hour or even half an hour. A short-term prediction is nevertheless temporally sufficient for this.

Additionally or alternatively, it is proposed that the network connection point is connected to a network section of the electric supply network and in the process will transmit the expected power to a network operator operating this network section, specifically as information relating to the expected power. In this respect, the network operator is able to plan with the power of the wind park. In particular, this is also helpful in the case of a network construction situation in which at least this network section has failed. The network operator can then use this power which is reported to him as available and can coordinate network construction on the basis thereof.

Optionally, the expected accuracy can also be transmitted in addition to the expected power. As a result, the network operator can carry out even better planning because the network operator has even better knowledge of what he can depend on in what framework. It is also the case here that the effect can be particularly highlighted by virtue of the fact that a plurality of wind parks operate in exactly the same manner, in particular in such a manner that all of this information can be automated, that is to say the network operator can combine said information in a process computer.

The expected accuracy can also relate to different variants here, as explained above. Moreover, the expected accuracy can also be at least partially concomitantly transmitted in the weather forecast. It may therefore at least partially be an item of information which is received from the external weather service by the wind park, in particular in a computer-processable form.

Additionally or alternatively, it is proposed that an accuracy target value which indicates the expected accuracy with which the expected power is intended to be provided is taken into account, wherein the accuracy target value is preferably received from the outside, in particular from a network operator. It is therefore proposed to orient the prediction to a predefined accuracy instead of or in addition to quantifying the accuracy of the created prediction.

It has been recognized that, depending on the situation, in particular the state of the electric supply network, a higher degree of accuracy may be required, which can result in an accordingly lower guaranteed power. A lower degree of accuracy may also be required with the then probably higher power. With transmission of such accuracy target values, the network operator can influence the available power for a prediction period, in particular for 15 minutes for example, depending on the situation, by virtue of the network operator using the accuracy target value to request a changed degree of accuracy. The required accuracy could be at a maximum at the start of network restoration, but, if there is enough certainty in the system, in particular if sufficient further wind parks whose inaccuracy can be compensated for are available, more loads can be supplied by reducing the accuracy target value.

According to one embodiment, it is proposed that the weather forecast comprises at least one temporal profile of an expected wind speed. Additionally or alternatively, the weather forecast may output a value of an expected wind speed at predetermined repetition intervals. In other words, a continuous or quasi-continuous temporal profile of an expected wind speed can be used. If the weather forecast outputs a value of an expected wind speed at predetermined repetition intervals, this may be, in particular, in the range from 1-5 minutes. A value is therefore determined and output every 1 minute or every 5 minutes or in a range between them, thus resulting in a quasi-continuous profile. These values should be distinguished from an update rate at which an existing weather forecast or weather data for the latter is/are updated, which may be in the region of 6 hours.

The expected power and additionally or alternatively a minimum value of the expected power is/are then determined as a temporal power profile from the weather forecast. This can be carried out, in particular, with the aid of the power estimator. The expected power is therefore determined as a profile, specifically as a profile over time, from the continuous or quasi-continuous temporal profile of the wind speed.

With respect to this power profile, it is then proposed to shift, stretch and/or compress it by means of the adjustment rule. This applies, in particular, to the amplitude of the power profile, with the result that it is virtually pushed up or down or is compressed. It may preferably or additionally also apply to its temporal extent. The power profile can therefore be pushed forward or back in time or can be stretched or compressed.

This is based on the knowledge that the weather forecast is fundamentally assumed to be correct and reliable. In particular, it is assumed that the power profile which is calculated from the weather forecast is substantially correct in terms of its basic profile. However, it has been recognized that such a power profile may arrive at the specific wind park possibly somewhat earlier or somewhat later than could be gathered from the weather forecast. This may be due, in particular, to the fact that the weather forecast is created more globally, that is to say for a larger region. Depending on where the wind park is located exactly in this larger region, for example precisely at its center, the forecast weather profile, in particular the power profile derived therefrom, may impinge on the wind park somewhat earlier or later. This can be compensated for by means of appropriate shifts. It may also be the case that the profile is somewhat delayed in reaching the wind park and is therefore stretched, which can be compensated for by means of compression. Analogously, compression which can be compensated for by means of stretching also comes into consideration.

A similar situation may also apply to the amplitude since an amplitude can increase or decrease, possibly over a relatively long path, when reaching the wind park. The same applies to a shorter path, specifically, in particular, based on a center of the larger region for which the weather forecast was created. Such an amplitude change can also be adjusted. The weather forecast and the power profile derived therefrom are therefore improved without the weather forecast or the power profile fundamentally having to be questioned. As a result, the weather forecast may be adjusted in a simple manner to the specific location of the wind park. Such an adjustment or another adjustment may also be referred to as refitting. If appropriate, the wind park or its immediate environment also has a special topology which can decelerate the wind, for example, with the result that a reduced power profile can be fundamentally assumed in the wind park. This can be accordingly compensated for by controlling the amplitude. According to one embodiment, it is proposed that, in order to determine the correction rule and/or the adjustment rule, meteorological measured values of the wind park are recorded in the wind park and/or in the local vicinity of the wind park. The weather forecast can therefore be accordingly improved, in particular it can thereby be adjusted to the current local values or can be adjusted on the basis of these values.

It is proposed to record a wind speed, additionally or alternatively a wind direction, additionally or alternatively a temperature, additionally or alternatively an air density and additionally or alternatively solar radiation as meteorological measured values. These values could also be used, in particular, to carry out a comparison with the weather forecast, and it is possible to derive therefrom, for example, whether the forecast weather profile at the wind park is after or before the weather forecast in terms of time. The correction rule can be determined accordingly. This may be fundamentally carried out during each comparison of said meteorological measured values, but depending, in particular, on how significant the respective variable is.

However, it is also possible to determine the adjustment rule on the basis of when at least one of these measured values, in particular the wind speed, is compared with the prediction. The values, for example the wind direction, can also be taken into account as boundary conditions.

Additionally or alternatively, it is proposed that measured values and/or operating values of wind power installations in the wind park are used to determine the correction rule and/or the adjustment rule. In particular, it is proposed that an available power is estimated from the measured values and/or operating values. This is based, in particular, on the concept of the wind power installation itself already allowing at least statements with regard to the prevailing wind conditions as a result of its operating behavior. This includes, in particular, the fact that the wind speed can be derived from the power, rotational speed and blade position and azimuth position and naturally also the characteristic variables of the wind power installation. The wind direction can be accordingly derived from the azimuth position which is usually also expressly known in the wind power installation. All of this can also be used for the comparison, in particular for the forecast comparison, in order to determine the adjustment rule.

The correction rule can also be determined with the aid of at least one of the values of the wind park, for example by virtue of the estimated available power of the wind park allowing conclusions to be drawn with respect to weather data in order to derive a correction of the weather forecast therefrom.

According to a further embodiment, it is proposed that the expected power of the wind park is determined on a wind park computing unit of the wind park. The calculation is therefore carried out locally in situ and has the advantage, in particular, that any installation values of the wind power installation or of the wind park can be concomitantly used in a simple manner without the need for complicated transmission.

In particular, it is proposed in this case that the wind park computing unit is provided with an uninterruptible power supply and, in the event of a network failure of the electric supply network, the wind park computing unit continues the determination of the expected power using the uninterruptible power supply and transmits it to a or the network operator. This is based, in particular, on the knowledge that the proposed method enables the wind park to be able to estimate the current weather situation as accurately as possible even in the event of a network failure and, as a result, has information relating to how much power is available, if appropriate, for restarting the wind park and therefore for supporting or restoring the electric supply network or a part of the latter. This information can be transmitted to the network operator and can be used by the latter for planning.

The uninterruptible power supply can also be used to control and/or carry out the process of recording local weather data and/or operating data of the wind park or to provide supply current required for this. The uninterruptible power supply may also provide a supply current for a computing unit with a data storage device which stores older weather forecasts, in particular the wind park computing unit.

According to one embodiment, it is proposed that, in the forecast comparison as the forecast variable, the predetermined expected wind variable or the expected power is compared with the current wind variable. The expected power corresponds, in particular, to the output power which is ultimately fed by the wind park into the electric supply network and can be compared with the current wind variable which is then accordingly the current output power of the wind park.

However, an intermediate variable may also be used for the comparison. The predetermined expected wind variable corresponds to such an intermediate value which can indicate, for example, a power which is still greater than the power which is actually fed in because effects in the park, for example follow-on effects, have not yet been taken into account, for example. The expected wind variable may also be a wind speed which was forecast and is compared with a representative measured value in the wind park or in the vicinity of the wind park.

According to one embodiment, it is proposed that the expected wind variable is determined from the weather forecast, in particular from weather data of the weather forecast, by means of a weather model. The weather model may contain the correction rule, or the correction rule is downstream of the weather model. Optionally, an idealized feed-in power is determined from the expected wind variable by means of a wind power model. If the idealized feed-in power is determined, the expected power is determined from the idealized feed-in power by means of an availability model. For this case, the method therefore comprises at least three steps, namely determining the expected wind variable from the weather forecast, determining the idealized feed-in power therefrom and determining the expected power therefrom.

Alternatively, the fact that the expected power is determined from the expected wind variable by means of a park model comes into consideration. In this respect, the expected power is determined from the expected wind variable without the intermediate step via the idealized feed-in power.

In particular, provision is made for the expected power to be determined using a or the power estimator, wherein the power estimator comprises at least one of the following models or is one of these models, specifically the weather model, the wind power model, the availability model and the park model.

The four individual models were explained in more detail above, and the proposal that these models may be combined in a power estimator is taken as a basis here, in particular. The fact that only some of these models are combined in the power estimator also comes into consideration, if appropriate. The weather forecast or the variables determined there, in particular, can then form the input for the power estimator, in which case further input variables can be added. The result, that is to say the output variable of the power estimator, is then the expected power on the basis of the corresponding input data. The abovementioned steps can also be combined in the power estimator in this manner. For this purpose, the respectively used models, for example, can be connected in series.

According to one embodiment, it is proposed that the weather model is adapted by means of a weather model adaptation. In this case, the weather model adaptation can be considered to be an adjustment rule or one of the at least one adjustment rules. Additionally or alternatively, the wind power model can likewise be adapted by means of a wind power model adaptation. In this case, the wind power model adaptation is then the adjustment rule or one of the adjustment rules.

The correction rule is preferably adapted by means of one of the at least one adjustment rules. According to one variant, this may also be included in the adaptation of the weather model if the correction rule is part of the weather model.

Additionally or alternatively, the availability model may likewise be adapted by means of an availability model adaptation. In this case, the availability model adaptation can then be considered to be one of the at least one adjustment rules.

Additionally or alternatively, it is proposed to adapt the park model by means of a park model adaptation. Accordingly, the park model adaptation can then be considered to be an adjustment rule.

According to one embodiment, it is therefore proposed that each of the four models mentioned is adapted. This adaptation can be carried out, in particular, in such a manner that the result of the respective model is compared with a corresponding measured value or at least with a current value determined from current values and the comparison is used to adapt the respective model.

The power estimator, in particular if it is used to determine the idealized feed-in power or the expected power, is preferably in the form of a neural network. In this respect, it is proposed that the neural network is trained in an off-line method, in particular is trained using meteorological measured values of the wind park. It is then additionally proposed that the trained neural network is used to determine the idealized feed-in power or the expected power.

The use and the training of such a neural network, in particular, are one possible way of implementing an adaptation. The use of the neural network has the advantage, in particular, that the structural relationships, on which a power estimator should respectively be based as far as possible, must be known less precisely when using such a neural network, as long as only the structure, including the levels, of the neural network is selected to be sufficiently large.

This is also based on the concept, in particular, that a particularly critical situation, in which the power should be forecast as accurately as possible, occurs only in a rare case of network restoration or even a black start. In this respect, the neural network can be trained normally. As long as the result is not used to control the wind park, an off-line method is also seen therein since the values determined in the process are not included directly in the control, but rather are stored. As a result, the neural network and therefore, in particular, the power estimator can be improved more and more during ongoing operation.

The result can be used, in particular, when such network restoration or a black start has to be carried out and the connection to the weather service which provides the weather forecast is also interrupted in this case. This is because older stored forecasts are preferably then resorted to and may accordingly necessitate a large adjustment for the wind park.

A wind park is provided. This wind park is provided for the purpose of feeding electric power into an electric supply network, and provision is made for the wind park to be connected to a network connection point in order to feed electric power into the electric supply network. The wind park also has an estimation device in order to determine an expected power for a predetermined feed-in period. This estimation device may be implemented as a device or as an implemented program in a control computer, in particular a central park computer.

In this case, provision is made for the expected power to indicate a value of a power or a temporal profile of a power which can be expected to be available to the at least one wind park as power from wind in the predetermined feed-in period, in particular as a sum of all rotor powers of all wind power installations in the wind park and/or as power of the wind park which can be fed in. The different possible meanings of the expected power have already been explained in connection with the feed-in method and the explanations stated there also apply here.

An evaluation device is also provided in order to determine an expected accuracy for the expected power, which expected accuracy is a measure of how accurately the power reaches the expected power in the feed-in period. This evaluation device may also be provided as a device or may be implemented as a program.

Additionally or alternatively, it is proposed that the estimation device for determining the expected power:
  comprises an expected wind estimator or is prepared to determine or verify at least one expected wind variable which is representative of the expected wind speed with the aid of a weather forecast; and
  comprises a correction unit which is prepared to additionally determine the expected wind variable, proceeding from the weather forecast, by means of a correction rule on the basis of local weather data and/or operating data of the wind park, wherein
  the estimation device is prepared to determine the expected power on the basis of the expected wind variable. The wind park is therefore prepared to determine the expected power, as explained above in connection with aspects of the method for feeding in electric power. The expected wind estimator, the correction unit and/or the estimation device may be provided individually or combined as a device or as a solution implemented on a process computer.

Additionally or alternatively, it is proposed that the expected wind estimator is prepared to predetermine the expected wind variable recurrently or continuously in each case for a comparison period with the aid of a weather forecast. The expected wind estimator therefore uses the weather forecast in order, on the basis thereof, to predetermine the expected wind variable again and again, in particular continuously or quasi-continuously.

The expected wind variable is representative of the expected wind speed and can therefore respectively comprise a wind speed value. However, normalized values or power values, which may likewise be representative of the expected wind speed, also come into consideration. Power values are representative of a wind speed, in particular, when they are based on the assumption that they each indicate a power which can be generated using a wind power installation or a wind park depending on the wind speed.

A comparison unit is also provided in order to carry out a forecast comparison for each comparison period for which the expected wind variable was predetermined, during which forecast comparison a forecast variable is compared with a current wind variable which is representative of the current wind speed in the respective comparison period. The comparison unit may also be in the form of a device or an implemented program.

An adjustment unit is also proposed in order to determine at least one adjustment rule from the forecast comparison in order to improve the expected power using the at least one adjustment rule. The adjustment unit therefore determines the adjustment rule. This was also explained above in connection with the method for feeding in electric power and analogously applies here. The adjustment unit, which therefore determines the adjustment rule, may also in turn be provided as a device or as an implementation of a program.

The estimation device is then prepared to determine the expected power on the basis of the expected wind variable and the adjustment rule.

It is therefore proposed, in particular, that the wind park is prepared to carry out a method according to at least one of the embodiments described above. In particular, the method can also be implemented in a central park computer using the devices and units described.

BRIEF DESCRIPTION OF THE SEVERAL VIEWS OF THE DRAWINGS

The invention is now explained in more detail below, by way of example, with reference to the accompanying figures.

DETAILED DESCRIPTION

Figure 1:
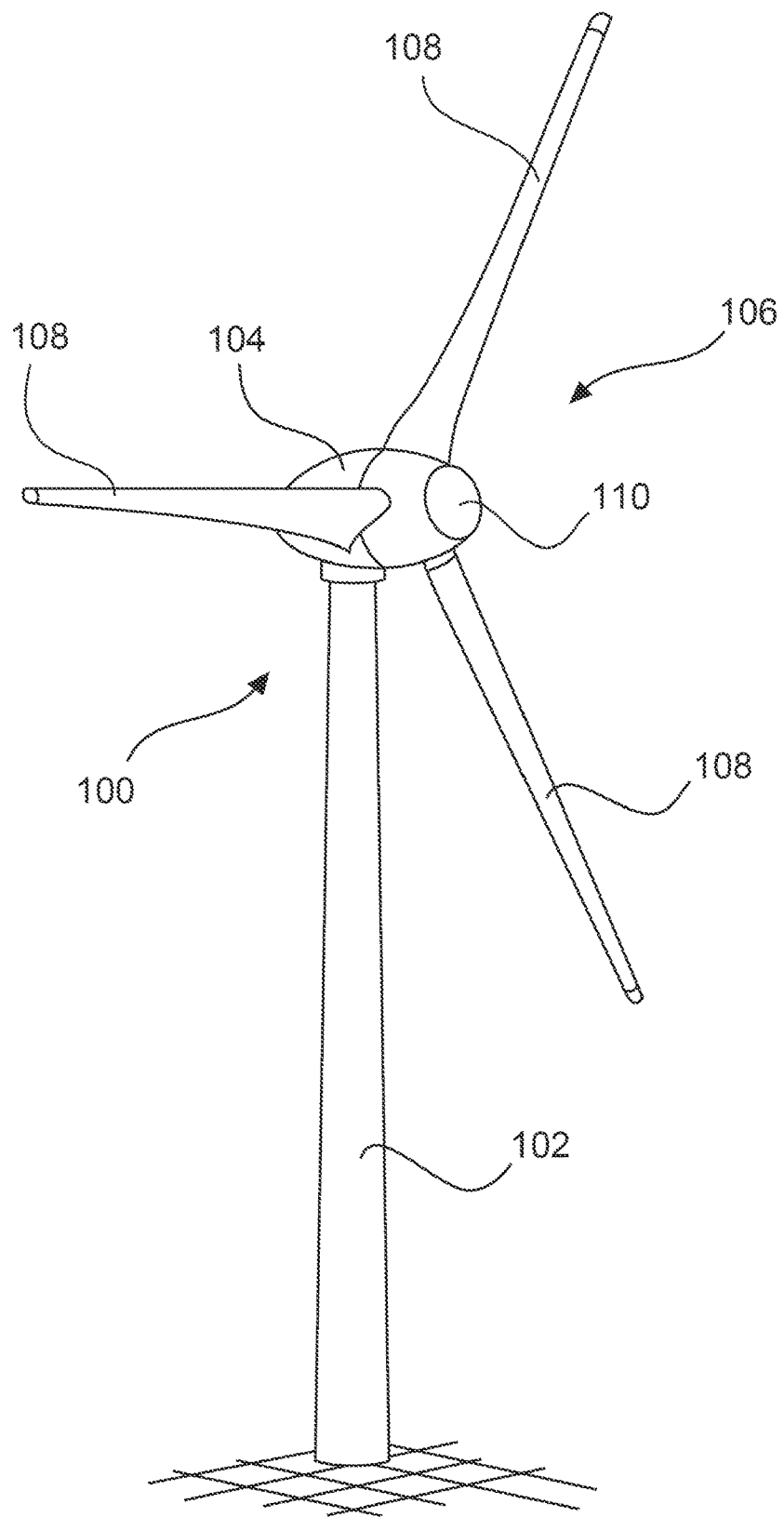
FIG. 1 shows a perspective illustration of a wind power installation.

FIG. 1 shows a wind power installation 100 having a tower 102 and a nacelle 104. A rotor 106 having three rotor blades 108 and a spinner 110 is arranged on the nacelle 104. During operation, the rotor 106 is caused to rotate by the wind and thereby drives a generator in the nacelle 104.

Figure 2:
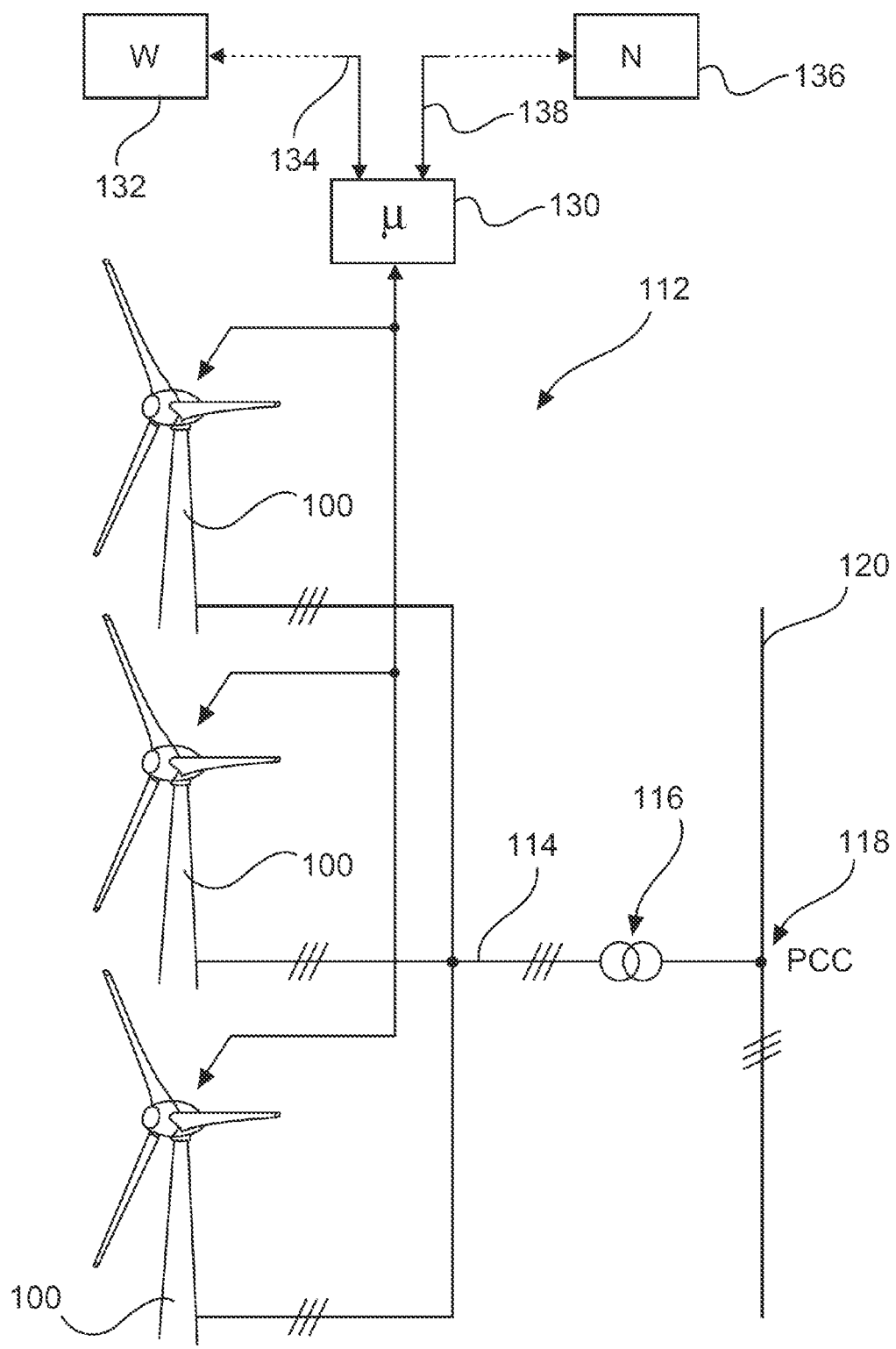
FIG. 2 shows a schematic illustration of a wind park.

FIG. 2 shows a wind park 112 having, by way of example, three wind power installations 100 which may be identical or different. The three wind power installations 100 are therefore representative of fundamentally any desired number of wind power installations in a wind park 112. The wind power installations 100 provide their power, specifically the generated current in particular, via an electric park network 114. In this case, the respectively generated currents or powers of the individual wind power installations 100 are added, and a transformer 116 is usually provided and steps up the voltage in the park in order to then feed it into the supply network 120 at the feed-in point 118, which is also generally referred to as the PCC. FIG. 2 is only a simplified illustration of a wind park 112, which does not show a controller, for example, even though a controller is naturally present. The park network 114 may also be configured differently, for example, by virtue of a transformer also being present at the output of each wind power installation 100, for example, to name just one other exemplary embodiment.

The wind park 112 also has a central park computer 130 which can be synonymously referred to, not only for the embodiment in FIG. 2, as a wind park computing unit. This central park computer 130 is provided, in particular, for the purpose of communicating with each wind power installation 100, in particular transmitting control commands and/or information to the latter or receiving information from the wind power installations 100. Such information may include operating values, such as currently generated powers, and measured values, such as a captured wind speed or a measured temperature.

The central park computer 130 may also be coupled to a weather service 132 in order to receive weather forecasts therefrom. However, the fact that the wind park provides the weather service with information, which is indicated by the double-headed arrow, also comes into consideration. The connection 134 between the central park computer 130 and the weather service 132 is partially depicted using dashed lines in order to indicate that the weather service may be arranged regionally far away from the wind park 112.

A network operator 136, with which the wind park 112 can likewise communicate by means of the central park computer 130, is also indicated. A network operator connection 138 which enables mutual communication, indicated by the double-headed arrow, is also provided here. The network operator connection 138 is also partially illustrated using dashed lines in order to indicate the possible regional distance.

Figure 3:
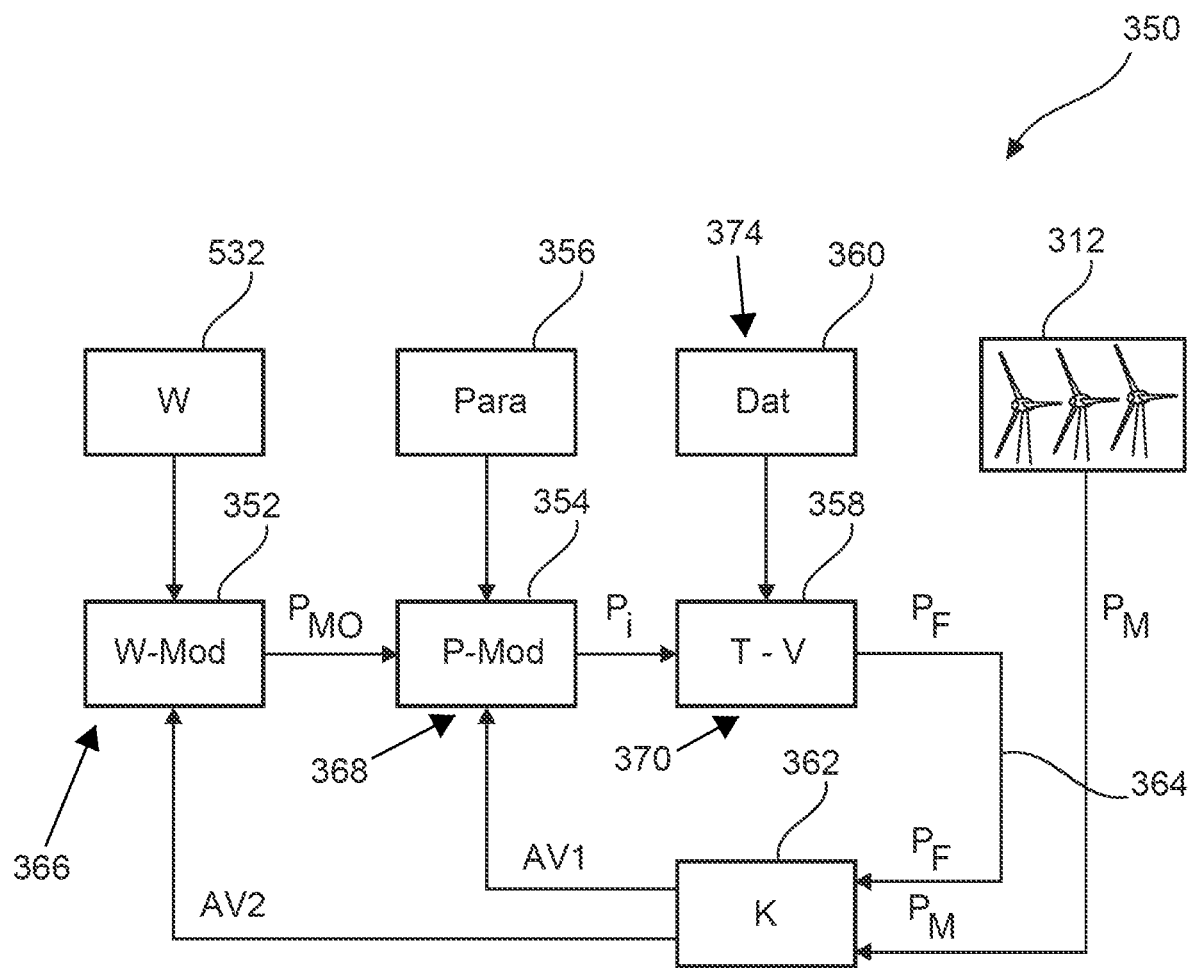
FIG. 3 shows a structure for schematically describing the method according to at least one embodiment.

FIG. 3 shows a structural diagram 350 which illustrates a method for achieving a wind prediction or a power prediction which is locally as accurate as possible. The method may be performed by the central park computer 130. In this respect, it is initially assumed that a weather service 532 provides weather data, for example various distributed values of air pressure, temperature, wind and precipitation for a region, to name just a few examples, and additionally or alternatively can provide weather data from one or more weather satellites.

These are then input to a forecast block 352. The forecast block may store, for example, numerical weather models or at least one of the latter, with the aid of which and with the aid of the input weather data a weather forecast can be created. A correction rule is additionally implemented in the forecast block 352 and can improve the weather forecast on the basis of local weather data and/or operating data of the wind park, namely can specifically adjust it to the wind park. In this respect, the correction rule can correct and at least improve the weather forecast based on the wind park and can therefore refit the weather forecast for the wind park. The correction rule may also be implemented as part of the weather model. The wind speed, in particular, is important for the present purposes and the forecast block 352 therefore outputs, in particular, an expected wind variable $P_{MO}$.

This expected wind variable $P_{MO}$ may be a wind speed or a profile of a wind speed which is specifically expected in a comparison period in the future. In particular, the expected wind value is provided as a short-term prediction. Since information relating to electric power is particularly relevant to the wind park, provision may also be made here for the expected wind variable $P_{MO}$ to be a power which is representative of a wind speed; the same then also applies to a wind speed profile. In this case, it is possible to use, in particular, a rotor power as an expected wind variable, which indicates a value above a value applied to a rotor of a wind power installation. Such a value may also be extrapolated to the relevant wind park examined here. The expected wind variable $P_{MO}$ could therefore be the sum of all expected rotor powers in the comparison period under consideration.

Nevertheless, this should be understood as meaning a variable which is representative of a wind speed and, in this respect, also subsequently excludes addressed park problems or park effects or wind power installation effects. If the sum of the rotor powers is therefore taken as a basis here, this is primarily a fictitious variable.

The expected wind variable $P_{MO}$ is then input to a wind power block 354. The wind power block 354 comprises a wind power model which is used to determine an idealized feed-in power $P_i$ from the expected wind variable $P_{MO}$. The wind power block 354 may simulate the wind power model by means of a neural network. The wind power block 354 can receive properties of the neural network for this purpose from a parameter block 356. In this case, the parameter block 356 may also transfer the entire structure of the neural network including parameterization after a corresponding learning process.

However, the use of a neural network is only one example, and other control-related implementations, which can likewise receive corresponding parameterizations, possibly structures and/or initial values from the parameter block 356, also come into consideration for the wind power model. The fact that the correction rule is used only or additionally in the wind power block also comes into consideration. This is provided, in particular, for the case in which the expected wind variable forms a power prediction and this is verified in the wind power block 354 by means of the correction rule. This correction in the wind power block 354 can also be combined with further changes in the expected wind variable.

The result of the wind power block 354 is an idealized feed-in power $P_i$ which could be theoretically generated by the examined wind park if the forecast, that is to say, in particular, the expected wind variable $P_{MO}$, is correct and all wind power installations in the park are also completely available. The expected power would then correspond to the verified expected wind variable. In this case, the wind direction is also concomitantly taken into account. The idealized feed-in power $P_i$ can be considered to be a verified expected wind variable and also depends, in particular, on park effects in the wind park. These include the general topology of the terrain in which the wind park is located and which surrounds the wind park, but also the mutual influence of the wind power installations. This generally includes, on the one hand, an attenuation of the wind field by the wind park, but, on the other hand, may also relate to specific influences of an upstream wind power installation with respect to a downstream wind power installation, that is to say a wind power installation precisely downwind. All of these relationships are taken into account in the wind power model which is used by the wind power block 354.

The idealized feed-in power $P_i$ is then input to the availability block 358. The availability block 358 takes into account the technical availability of each individual installation in the wind park. The availability block obtains the data for this purpose from the data block 360. All availability data relating to the wind power installations in the wind park are therefore collected and continuously updated in the data block 360. Said data block contains, in particular, when a wind power installation fails, for example. However, the fact that a wind power installation can be operated only in a reduced manner because this is prescribed by noise protection rules, for example, also comes into consideration. All information of this type is stored for each wind power installation in the park in the data block 360 and is transferred to the availability block 358. In this case, general data relating to the relevant wind power installation, for example its nominal power, may possibly also be transferred if such data are not already permanently stored in the availability block 358.

In any case, the availability block 358 can determine an expected power $P_F$ of the wind park from the idealized feed-in power $P_i$. This expected power $P_F$ is a forecast power, in particular in the form of a short-term prediction 364, which then ideally corresponds to the power actually captured overall in the wind park, which may also be the power fed in by the wind park. However, it is also possible here to use a wind equivalent, that is to say a wind speed, which would result in such a power.

Accordingly, a measured wind park power $P_M$ or said wind equivalent is captured by a symbolically illustrated wind park 312.

Both the expected power $P_F$ and the measured wind park power $P_M$ are then input to a comparison block 362 and compared. In this case, the respective values or profiles for the identical comparison period are naturally used. If a forecast is therefore made for a period which is approximately half an hour in the future, the expected power $P_F$ determined therefrom is accordingly compared with the measured park power $P_M$ which is accordingly measured said half an hour later. In this respect, the comparison block 362 may also be accordingly complex and may also have, in particular, a storage device for a plurality of expected powers.

In particular, the comparison block 362 then also carries out an evaluation, wherein a separate block could also be used for this purpose, specifically an adjustment unit which carries out this evaluation and creates an adjustment rule. In the embodiment in FIG. 3, this is concomitantly integrated in the comparison block 362.

As the result, both an adjustment rule for the wind power block 354 and therefore the wind power model 368 implemented there and an adjustment rule for the forecast block 352 and therefore the weather model(s) 366 used there emerge in the embodiment in FIG. 3. The adjustment rules are referred to as AV1 and AV2.

However, the practice of using only one of the two adjustment rules AV1 or AV2 mentioned or of using other adjustment rules also comes into consideration. The adjustment rule AV2 can also be used to adjust the correction rule which is implemented in the forecast block 352.

In particular, it has been recognized that a current, that is to say newly calculated, prediction is no longer available under certain circumstances for regenerative power plants, in particular wind parks, in a network restoration situation because computing centers, in particular, are off-line or no longer have a data connection.

A prediction is needed, in particular, during network restoration where the predictions which have already been calculated may already have a considerable deviation from the actual available power after a few hours of power failure. The prediction should also be available at the wind park level and should even be calculated, under certain circumstances, at the wind park level. A short-term prediction, provided via the network operator interface, may also be used for active network operational management of distribution networks or in accounting grid management.

One idea is to provide this prediction by refitting old predictions at the wind park level. Old predictions or weather forecasts are therefore used and are adjusted to the specific wind park.

In particular, wind parks on medium-voltage substations and on high-voltage and extra-high-voltage levels are proposed.

This makes it possible to achieve, in particular, improved operational management in critical network situations.

It is therefore proposed, in particular, to adjust predictions, in particular old predictions or old weather forecasts, in order to create wind-park-focused feed-in predictions in order to thus in turn create short-term predictions for active operational management.

At least one embodiment proposes an apparatus for holding and providing a short-term prediction at the wind park level, comprising the following functionality:

receiving a prediction, which here represents a weather forecast in particular, at regular intervals, for example from prediction service providers such as weather services;

storing the prediction in a wind park storage device, in particular in a central park computer;

determining and providing a short-term prediction, for example providing a prediction via a network operator interface which can be used to establish a connection from the wind park to a network operator;

refitting, that is to say adjusting, a stored prediction by means of available local measured values which may be current and past measured values; and providing an improved prediction, in particular in the form of the expected wind variable and/or expected power.

The following can be used for the local measured values:

an anemometer on wind power installations in the wind park, in particular a nacelle anemometer;

nearby wind parks, in particular their anemometers, or corresponding information relating to a feed-in power;

wind metmasts which can be connected via Meteo DB or directly; and/or local weather stations.

The proposed method at least according to one embodiment comprises the following or parts thereof:

creating wind-park-focused feed-in predictions on the basis of external numerical weather forecast and SCADA data, in particular by means of spatiotemporal regression methods;

rapid-update cycle, that is to say the practice of carrying out rapid updates of the captured and/or predicted values using an internal weather forecast model; and in the process using live SCADA data for data assimilation.

Controllable local loads and usable storage devices, specifically at least one storage device state of charge and/or available power, are taken into account in the prediction and to minimize uncertainty.

One aim is to increase the forecast accuracy of the wind park power by changing a portfolio forecast to a wind-park-focused prediction.

For this purpose, the forecast model is subdivided into three individual models which can be separately validated, specifically, in particular, the weather model, the wind power model and the availability model (e.g., availability model 370 in FIG. 3).

It has been recognized that interconnecting the individual models which have been optimized for the wind park results in a more accurate wind-park-focused prediction than models which represent the entire uncertainty chain, in particular the wind forecast, location stability, follow-on model, technical availability and electrical losses, in a blurred or fused manner in a model and are optimized for a large portfolio, that is to say are aimed at remuneration and less at specific and local values.

Figure 6:
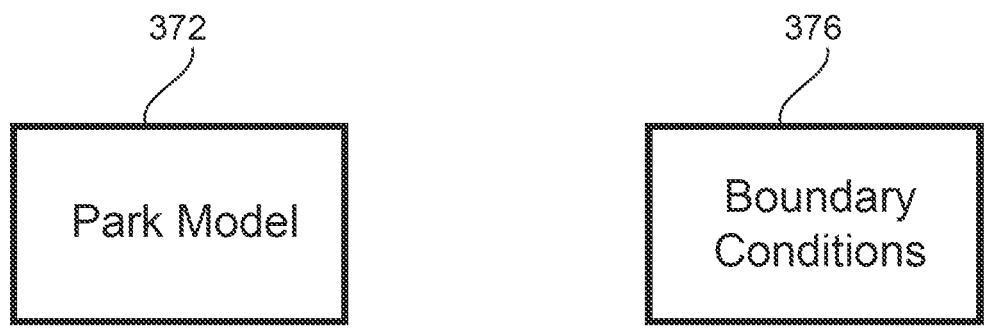
FIG. 6 shows the park model and the boundary conditions.

It is proposed that a correction loop or a plurality of correction loops is/are incorporated in the forecast chain, specifically, in particular, extending from the weather data from the forecast block 532 to expected powers which have been determined, which correction loop(s) statistically correct(s) the model forecast, in particular using the improvement or correction means of smoothing, linear regression, a sliding average, dynamic weighting, bias correction, using measured data. Depending on the available data source, SCADA power data (for example also from adjacent wind parks), nacelle anemometer data, status codes or meteorological measurement stations are used. Accordingly, the correction with respect to wind data is applied to the weather models and, in the case of power data, is applied to the wind park model (e.g., park model 372 in FIG. 6) which may be a neural network, in particular.

According to one aspect, the accuracy of a prediction, in particular, is concomitantly taken into account. This is based on the following concepts.

In a network restoration situation, a current, that is to say newly calculated, prediction is no longer available under certain circumstances for regenerative power plants such as wind parks because computing centers are off-line, for example, or no longer have a data connection. After a few hours of power failure, the predictions which have already been calculated already have a considerable deviation from the actual available power and considerable uncertainty. However, in critical network situations, in addition to a prediction, the network operator also requires a quantification of the uncertainty in order to concomitantly take it into account in the control of the wind parks. The prediction and the uncertainty of the prediction must also be available at the wind park level and may even be calculated at the wind park level under certain circumstances.

However, a short-term prediction including uncertainty, provided via the network operator interface, can also be used for active network operational management of distribution networks or in accounting grid management.

The idea is, in particular, to quantify the prediction inaccuracy.

This applies, in particular, to wind parks on medium-voltage substations and high and extra-high voltages.

Improved operational management in critical network situations is also intended to be achieved, in particular.

The object can also be considered to be that of ensuring that the maximum possible power is always available depending on the network situation and prediction deviation which can be tolerated.

An apparatus or a method for holding and providing a prediction including prediction uncertainty at the wind park level is proposed, in particular. In this respect, the following steps or approaches are proposed:

receiving a prediction, in particular with a probability distribution, at regular intervals, for example from prediction service providers;

storing the prediction in a wind park storage device; and calculating a possible prediction deviation or a probability distribution on the basis of the weather situation, available installations, age of the prediction and/or number of available measurement sensors.

Alternatively: calculating and communicating a guaranteed minimum power on the basis of a minimum certainty to be predefined (e.g., 95%).

The following can be explained as an example:

The network operator could specify, for example, via the network operator interface, the availability with which the network operator requires the minimum available power and the (short-term) prediction, or the network operator can directly request the uncertainty and can therefore itself consider this in the control.

The following are proposed as additional possibilities:

Reducing the uncertainty by taking a plurality of wind parks into account; considering available controllable loads and storage devices when calculating the uncertainty. This may mean the following, for example: in the case of a half-full state of charge of a storage device, half of the storage capacity is available for compensating for the prediction uncertainty.

Preliminary studies have shown that the uncertainties of each individual model can be reduced using a multi-model approach by means of additional information and manufacturer know-how relating to wind power installations and the wind park, which external forecast companies/traders do not have. The expected uncertainty of a wind park transfer model which has been created by means of a neural network may be −2.5% (on the basis of the quality and available historical power data).

The internal know-how relating to wind power installation technology reduces the uncertainty with respect to predicted technical turbine availabilities to 1%. The greatest uncertainty is in the weather forecast. This can be reduced both by means of intelligent weighting of different numerical weather models and by means of statistical corrections based on various measurement data in the wind park environment. It is therefore advantageous to combine these aspects.

The uncertainty funnel of the forecast can be reduced, on the one hand, by means of short-term corrections using measurement data and additionally or alternatively with coupled storage device solutions in the wind park. A combination of a plurality of wind parks running on a network operator interface can likewise reduce the uncertainty.

Figure 5:
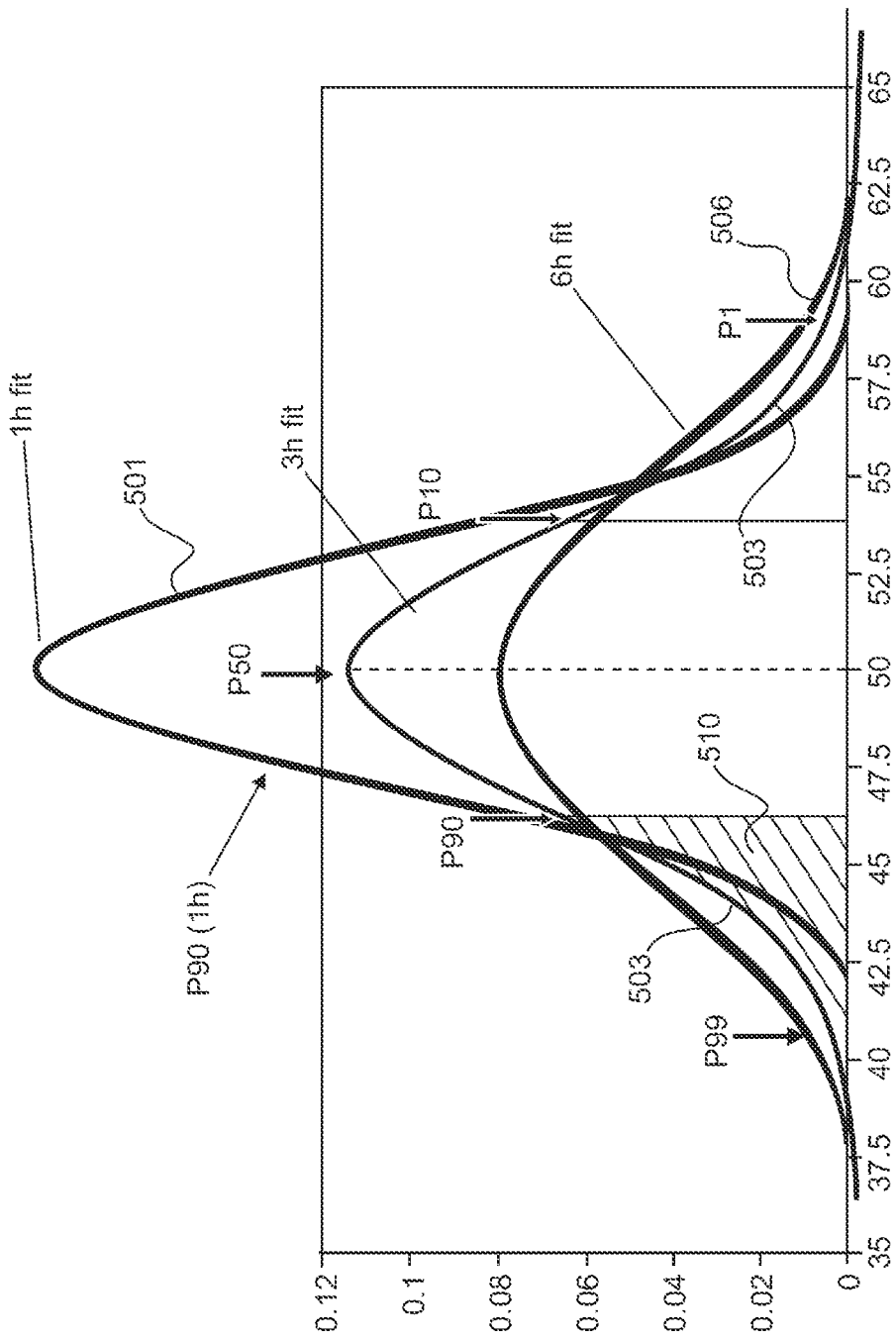
FIG. 5 illustratively shows a distribution curve.

All three measures support the possibility of providing the network operators with a considerably higher P90 value, which describes the wind park power which occurs with a probability of 90%, for the forecast. This is illustrated in FIG. 5 which shows probability distributions, assuming an approximate normal distribution, for different adjustments. The ordinate shows the probability densities and the abscissa shows a normalized scale for the value of the examined result. The scale may be assumed here to be a normalized indication of a park power, in particular a rotor power, for example based on a maximum rotor power or a maximum sum of all rotor powers, that is to say without considering a limitation to nominal power, for example. In this case, the value marked 50 is the forecast power. The value may also represent an absolute value such as 50 MW, for example. This Figure is concerned, in particular, with the fundamental comparison of a plurality of prediction curves.

In this case, an adjustment, in particular by means of the correction rule, was carried out or simulated for a 1-hour prediction (1 h fit), for a 3-hour prediction (3 h fit) and for a 6-hour prediction (6 h fit), and a 1-hour distribution 501, a 3-hour distribution 503 and a 6-hour distribution 506 were accordingly represented. The P1, P10, P50, P90 and P99 positions were also marked for the 3-hour prediction. It can be seen, in particular, that the accuracy is increased in the short-term prediction adjustment and therefore in the short-term prediction. A P90 value is also indicated as "P90(1 h)" for the 1-hour prediction. The P90 value indicates the wind park power which at least occurs with a probability of 90%. This therefore corresponds to the surface area of the area below the respective curve to the right of the P90 value, based on the total area below the curve.

The area to the left of the P90 value accordingly has a surface area of 10%, and such an area is depicted as a remaining area 510 for the 3-hour prediction. This is improved with a shorter forecast, which can be seen from the high value of the 1-hour prediction at 50. This also results in the curve becoming narrower and the 10% remaining area ending further to the right, with the result that the P90 value is also further to the right and is therefore closer to the forecast power.

On the basis of FIG. 3, it can be illustrated that the uncertainty of the weather forecast from the weather service 532 may be approximately 6 to 8%. The uncertainty of the model which describes the wind park and can be illustrated using the parameter block 356 or using the wind power block 354, in which the calculation then takes place, may be approximately 2.5%. The technical availability which can be illustrated by the data block 36 or by the availability block is approximately 1%.

Figure 4:
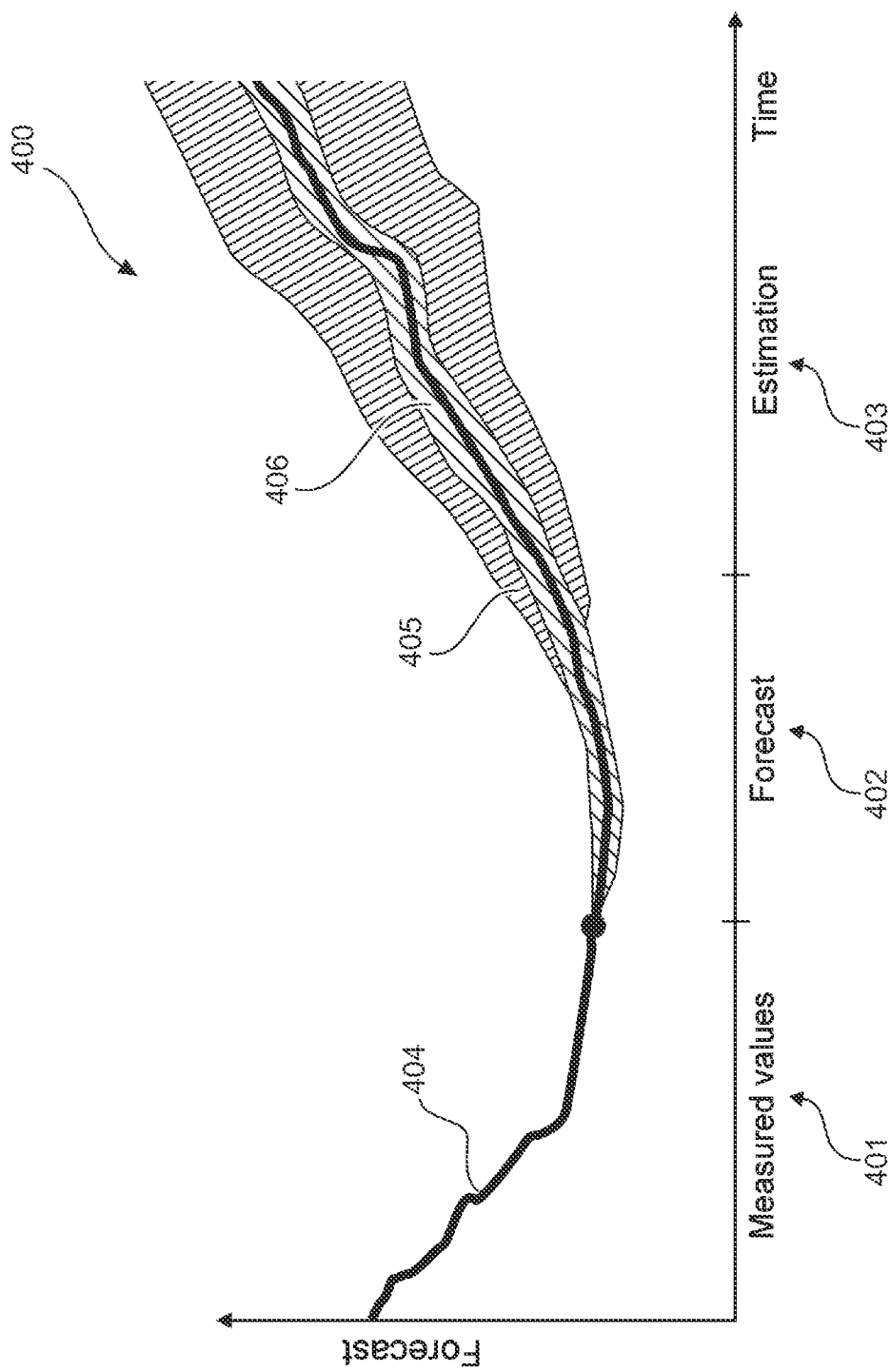
FIG. 4 illustratively shows a graph with an uncertainty funnel.

FIG. 4 explains a so-called uncertainty funnel. In this respect, FIG. 4 shows an uncertainty graph 400 in which forecast values are illustrated as a forecast curve over time with their uncertainty.

The time axis is divided into three regions for this purpose. The first time region 401 is not yet in the future, with the result that the prediction values correspond to the measured values, and so there is no uncertainty.

The second time region 402 is in the future, and there is therefore uncertainty which increases with time. The actual value can therefore be in the region of the uncertainty range shown and can accordingly deviate from the forecast curve 404.

The third time region 403 is yet further in the future, and a difference between a park uncertainty curve 405 and a weather uncertainty curve 406 can now be clearly distinguished. The park uncertainty curve 405 describes the uncertainty on account of the park inaccuracy and measurement uncertainties, whereas the weather uncertainty curve 406 describes an uncertainty on account of the weather forecast. The park uncertainty curve 405 forms a substantially smaller funnel than the weather uncertainty curve 406 in this case.

The invention claimed is:

1. A method for feeding electric power into an electric supply network at a network connection point using a wind park including a plurality of wind power installations, comprising:
    determining an expected power for a particular feed-in period, the expected power indicating a power value of wind power expected from the wind park in the particular feed-in period, wherein determining the expected power includes:
        receiving a weather forecast, wherein the weather forecast includes an associated expected accuracy value,
        determining, using the weather forecast, an expected wind speed for the particular feed-in period,
        determining an adjusted expected wind speed based on the expected wind speed, local weather data measured in an environment of the wind park, and local operating data of the wind park, and
        determining the expected power based on the adjusted expected wind speed;
    determining an expected accuracy of the expected power based on the associated expected value of the weather forecast, the expected accuracy of the expected power being an expected measure of accuracy of power reaching the expected power during the particular feed-in period; and
    planning a black start and/or network restoration based on the expected power and the expected accuracy of the expected power.

2. The method as claimed in claim 1, wherein:
    the weather forecast is generated over a forecast period, and
    the forecast period is at least ten times longer than the particular feed-in period.

3. The method as claimed in claim 1, comprising:
    determining the expected wind speed continuously for respective comparison periods;
    performing a forecast comparison for each comparison period by comparing a forecast variable with a current wind variable representative of a current wind speed in the respective comparison period; and
    adjusting the expected power based on the forecast comparison.

4. The method as claimed in claim 1, comprising:
    determining the expected power using a power estimator, and/or
    determining the expected power taking into account boundary conditions, wherein the boundary conditions are selected from a list including:
        availability of the wind power installations in the wind park,
        information relating to available controllable loads,
        information relating to storage devices available for feeding in electric power, and
        information relating to wind field conditions of the wind park, and/or
    determining the expected power by individually considering the plurality of wind power installations in the wind park, wherein:
        a performance of each wind power installation of the plurality of wind power installations is stored in a table, and
        the table includes a forecast performance for each wind power installation of the plurality of wind power installations on the basis of an azimuth orientation of the wind power installation, a wind direction of the wind power installation or a time of day.

5. The method as claimed in claim 1, wherein the determining the expected accuracy includes determining at least one of:
    a first power limit indicating a power or a power profile, wherein the expected power exceeds the first power limit during the particular feed-in period with a particular probability,
    a second power limit indicating a power or a power profile, wherein the expected power exceeds the second power limit over a period of 10 to 60 seconds, and
    a third power limit indicating a power or a power profile, wherein the expected power exceeds the third power limit over a period of 5 to 10 seconds.

6. The method as claimed claim 1, comprising:
    regularly transmitting, by an external weather service, the weather forecast to the wind park;
    temporarily storing, by the wind park, the respectively transmitted weather forecast; and
    in response to an interruption to the external weather service, estimating the expected power on the basis of at least one stored weather forecast and adjusting the at least one stored weather forecast based on current local meteorological measured values.

7. The method as claimed in claim 1, wherein:
    the network connection point is connected to a network section of the electric supply network,
    in the event that the network section fails, the expected power is transmitted to a network operator operating the network section,
    the expected accuracy and the expected power are transmitted together, and/or
    an accuracy target value is received from the network operator and indicates the expected accuracy.

8. The method as claimed in claim 1, wherein:
the weather forecast includes at least one temporal profile of the expected wind speed, and/or the weather forecast outputs a value of the expected wind speed at particular repetition intervals,
the expected power and/or a minimum value of the expected power are determined as the at least one temporal power profile from the weather forecast, and
the power profile is shifted or changed in amplitude or temporally.

9. The method as claimed in claim 1, comprising:
recording meteorological values measured in the environment of the wind park, wherein the meteorological values include one or more meteorological values selected from a list of meteorological values including:
wind speed;
wind direction;
temperature;
air density; and
solar radiation.

10. The method as claimed in claim 1, comprising:
determining the expected power of the wind park by a wind park computer.

11. The method as claimed in claim 3, wherein comparing the forecast variable with the current wind variable includes comparing a particular adjusted expected wind speed, or the expected power with the current wind variable.

12. The method as claimed in claim 1, comprising:
determining the expected wind speed from the weather forecast using a weather model,
determining an intermediary feed-in power from the expected wind speed using a wind power model, and determining the expected power from the intermediary feed-in power using an availability model, wherein the wind power model models properties of the wind park using a neural network, and
determining the expected power from the expected wind speed using a park model, wherein the expected power is determined using a power estimator including at least one model from:
the weather model including a first adjustment step;
the wind power model for determining the intermediary feed-in power;
the availability model for determining the expected power from the intermediary feed-in power; and
the park model including a second adjustment step.

13. The method as claimed in claim 12, wherein:
a power estimator, for determining the intermediary feed-in power or the expected power, is a neural network.

14. The method as claimed in claim 1, wherein the expected power is a sum of a plurality of rotor powers of the plurality of wind power installations, respectively.

15. The method as claimed in claim 2, wherein the forecast period is at least one hundred times as long as the particular feed-in period.

16. The method as claimed in claim 10, wherein the wind park computer has an uninterruptible power supply and, in the event of a network failure of the electric supply network, the wind park computer continues operating using the uninterruptible power supply, wherein the operating includes determining the expected power and transmitting the expected power to a network operator.

17. The method as claimed in claim 1, wherein the power value of wind power is a temporal profile of the wind power, the temporal profile including multiple power values with respect to time.

18. A wind park for feeding electric power into an electric supply network at a network connection point, comprising:
a wind park computer configured to:
determine an expected power for a particular feed-in period, the expected power indicating a power value of wind power expected from the wind park in the particular feed-in period, wherein determining the expected power includes:
receiving a weather forecast, wherein the weather forecast includes an associated expected accuracy value,
determining, using a weather forecast, an expected wind speed for the particular feed-in period,
determining an adjusted expected wind speed based on the expected wind speed, local weather data measured in an environment of the wind park, and local operating data of the wind park, and
determining the expected power based on the adjusted expected wind speed;
determine an expected accuracy of the expected power based on the associated expected accuracy value of the weather forecast the expected accuracy of the expected power being an expected measure of accuracy of power reaching the expected power during the particular feed-in period; and
plan a black start and/or network restoration based on the expected power and the expected accuracy of the expected power.

19. The wind park as claimed in claim 18, wherein the wind park computer is configured:
determine the expected wind speed continuously for respective comparison periods,
perform a forecast comparison for each comparison period by comparing a forecast variable with a current wind variable representative of a current wind speed in the respective comparison period, and
adjust the expected power based on the forecast comparison.

* * * * *

UNITED STATES PATENT AND TRADEMARK OFFICE
CERTIFICATE OF CORRECTION

PATENT NO. : 12,140,119 B2
APPLICATION NO. : 17/285059
DATED : November 12, 2024
INVENTOR(S) : Johannes Brombach et al.

Page 1 of 1

It is certified that error appears in the above-identified patent and that said Letters Patent is hereby corrected as shown below:

In the Claims

Column 24, Claim 6, Line 46:
"as claimed claim 1," should read: --as claimed in claim 1,--.

Signed and Sealed this
Twenty-fifth Day of February, 2025

Coke Morgan Stewart
*Acting Director of the United States Patent and Trademark Office*